US012783115B2

(12) United States Patent
Maekawa

(10) Patent No.: US 12,783,115 B2
(45) Date of Patent: Nov. 3, 2026

(54) DISPLAY CONTROL SYSTEM AND METHOD AND NON-TRANSITORY COMPUTER READABLE MEDIUM

(71) Applicant: FUJIFILM Business Innovation Corp., Tokyo (JP)

(72) Inventor: Takao Maekawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/454,793

(22) Filed: Aug. 24, 2023

(65) Prior Publication Data

US 2024/0319861 A1 Sep. 26, 2024

(30) Foreign Application Priority Data

Mar. 20, 2023 (JP) ................................ 2023-044506

(51) Int. Cl.

*G06F 3/04847* (2022.01)
*G06F 3/0482* (2013.01)
*H04N 1/00* (2006.01)

(52) U.S. Cl.

CPC ........ *G06F 3/04847* (2013.01); *G06F 3/0482* (2013.01); *H04N 1/00503* (2013.01); *H04N 1/00506* (2013.01); *H04N 1/00464* (2013.01); *H04N 1/00474* (2013.01); *H04N 2201/0094* (2013.01)

(58) Field of Classification Search

None
See application file for complete search history.

(56) References Cited

U.S. PATENT DOCUMENTS

| | | | | |
|---|---|---|---|---|
| 7,565,623 | B2 * | 7/2009 | Beam | G06F 3/0481 715/833 |
| 9,848,849 | B2 * | 12/2017 | Pfeiffer | A61B 8/13 |
| 2006/0242131 | A1 * | 10/2006 | Okabe | G06F 16/3325 |
| 2007/0268517 | A1 * | 11/2007 | Koarai | H04N 1/00973 358/1.15 |
| 2010/0067045 | A1 * | 3/2010 | Shigenobu | H04N 1/00973 358/1.15 |
| 2015/0169285 | A1 * | 6/2015 | Reyes | G06F 3/167 715/728 |
| 2017/0085751 | A1 * | 3/2017 | Kakutani | H04L 63/083 |

(Continued)

FOREIGN PATENT DOCUMENTS

| | | |
|---|---|---|
| JP | 2016148886 | 8/2016 |
| JP | 6780913 | 11/2020 |

*Primary Examiner* — Toan H Vu
(74) *Attorney, Agent, or Firm* — JCIPRNET

(57) ABSTRACT

A display control system includes at least one processor configured to: display for a user plural setting items including a setting item for which first software is able to set a setting and a setting item for which second software is able to set a setting in a mode in which the user is able to select a setting item from the plural setting items, the first software and the second software being different from each other; receive selecting of a setting item from the displayed setting items from the user; and display, between a first setting screen and a second setting screen, a setting screen that is able to set a setting for the setting item selected by the user, the first setting screen being used for setting a setting with the first software, the second setting screen being used for setting a setting with the second software.

7 Claims, 12 Drawing Sheets

(56) References Cited

U.S. PATENT DOCUMENTS

| | | | | |
|---|---|---|---|---|
| 2018/0246687 | A1* | 8/2018 | Nishio | G06F 3/1221 |
| 2018/0373803 | A1* | 12/2018 | Shultz | G06F 16/9577 |
| 2019/0340662 | A1* | 11/2019 | Masenza | G06Q 30/0637 |
| 2020/0076983 | A1* | 3/2020 | Ohnishi | H04N 1/00413 |
| 2022/0066619 | A1* | 3/2022 | Urakawa | H04N 1/00442 |
| 2023/0086919 | A1* | 3/2023 | Ogino | G06F 3/1205 358/1.1 |

* cited by examiner

FIG. 5

500

Scanner Settings

| Setting item | Panel UI | Web UI |
|---|---|---|
| Background color removal | 0 | 1 |
| Fast web view | 0 | 1 |
| Thumbnail | 0 | 1 |
| Maximum number of pages stored | 1 | 0 |
| Duplex document feed | 1 | 0 |
| Setting of background color removal level | 1 | 0 |
| Show-through prevention level | 1 | 0 |
| File-split sending | 1 | 0 |

501

FIG. 11

500

Scanner Settings

501

| Setting item | Panel UI | Web UI |
|---|---|---|
| Background color removal | 0 | 1 |
| Fast web view | 0 | 1 |
| Thumbnail | 2 | 1 |
| Maximum number of pages stored | 1 | 0 |
| Duplex document feed | 1 | 0 |
| Setting of background color removal level | 1 | 0 |
| Show-through prevention level | 1 | 0 |
| File-split sending | 1 | 2 |

FIG. 12A Scanner Settings

500

501

| Setting item | Panel UI | Web UI |
|---|---|---|
| Background color removal | 0 | 1 |
| Fast web view | 0 | 1 |
| Thumbnail | 0 | 1 |
| Maximum number of pages stored | 1 | 0 |
| Duplex document feed | 1 | 0 |
| Setting of background color removal level | 1 | 0 |
| Show-through prevention level | 1 | 0 |
| Output file format | 1 | 1 |

FIG. 12B Output File Format

600

601

| Sub-item | Panel UI | Web UI |
|---|---|---|
| File type | 1 | 1 |
| Compression method | 1 | 1 |
| Thumbnail | 1 | 0 |
| Divide file by page | 1 | 0 |
| High compression | 0 | 1 |
| Character recognition | 0 | 1 |
| Fast web view | 0 | 1 |
| PDF security | 0 | 1 |
| PDF signature | 0 | 1 |

DISPLAY CONTROL SYSTEM AND METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2023-044506 filed Mar. 20, 2023.

BACKGROUND

(i) Technical Field

The present disclosure relates to a display control system and method and a non-transitory computer readable medium.

(ii) Related Art

A multifunction device, which is an image forming device including various functions, such as a copy function, a scan function, and a fax function, has many setting items. There are basically two types of setters that can set settings of such a multifunction device. One type is a setter that sets a setting by using a panel and an operation unit provided in the multifunction device. The other type is a setter that displays a setting page provided by a web server integrated in the multifunction device on another device, such as an electronic terminal, by using browser software and receives a setting set by the electronic terminal. These two types of setters are implemented by different types of software. The two types of setters have been developed aiming at different purposes due to various reasons, such as the difference between the operability of a panel provided in a multifunction device and that of a display screen of an electronic terminal and the difference in the policy on operation provision, and also in accordance with the development plan for each type of setter. For this reason, typically, these types of setters are not integrated into each other. That is, a user may not be able to set settings for all setting items by using only one type of setter and may be required to use both types of setters because not all the setting items are included in one type of setter.

In view of this background, Japanese Unexamined Patent Application Publication No. 2016-148886, for example, discloses a technology for allowing a user to more simply perform an operation that the user wants or to select a screen layout that the user wants to use by the provision of a medium for switching between two types of screens.

SUMMARY

When multiple setters are available, to efficiently set or change a setting, a user is required to understand the functions and configurations provided by these setters and also to memorize them.

Aspects of non-limiting embodiments of the present disclosure relate to assisting a user in setting or changing a setting of a setting item, when multiple setters are available, without being aware in which one of the multiple setters this setting item is included.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a display control system including at least one processor configured to: display for a user plural setting items including a setting item for which first software is able to set a setting and a setting item for which second software is able to set a setting in a mode in which the user is able to select a setting item from the plural setting items, the first software and the second software being different from each other; receive selecting of a setting item from the displayed setting items from the user; and display, between a first setting screen and a second setting screen, a setting screen that is able to set a setting for the setting item selected by the user, the first setting screen being used for setting a setting with the first software, the second setting screen being used for setting a setting with the second software.

BRIEF DESCRIPTION OF THE DRAWINGS

An exemplary embodiment of the present disclosure will be described in detail based on the following figures, wherein:

FIG. 5 illustrates an example of a setting function implementation table stored in a storage of the image forming device;

FIG. 11 illustrates an example of the setting function implementation table used in a first modified example;

FIG. 12A illustrates an example of the setting function implementation table used in a second modified example; and FIG. 12B illustrates an example of a sub-item implementation table indicating UIs that can set settings of sub-items.

DETAILED DESCRIPTION

An exemplary embodiment of the disclosure will be described below in detail with reference to the accompanying drawings.

(Overall Configuration of Display Control System)

Figure 1:
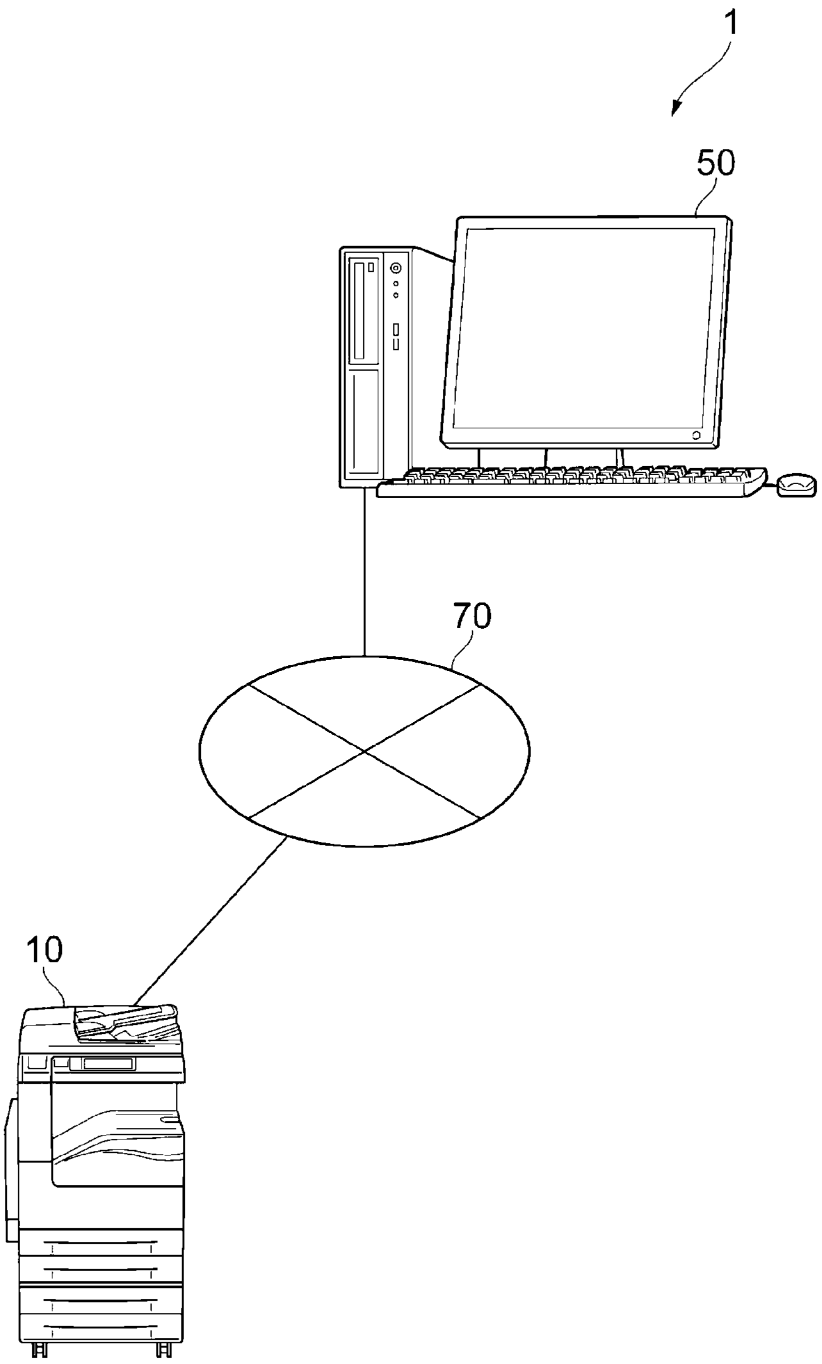
FIG. 1 is a schematic view illustrating an example of the overall configuration of a display control system according to the exemplary embodiment.

FIG. 1 is a schematic view illustrating an example of the overall configuration of a display control system 1 according to the exemplary embodiment.

As illustrated in FIG. 1, the display control system 1 includes an image forming device 10 and a terminal device 50. The terminal device 50 is connected to the image forming device 10 via a network 70 so as to receive an instruction to be provided to the image forming device 10 from a user. The image forming device 10 and the terminal device 50 are connected to each other via the network 70.

The image forming device 10 in the exemplary embodiment is a device which forms an image on a recording medium, such as paper, and outputs the recording medium as a printed medium. The image forming device 10 has image processing functions, such as a scanner function and a fax function, as well as a printer function. The image forming device 10 includes setters that set settings of various functions of the image forming device 10. As an example of such setters, the image forming device 10 includes a setter that sets settings of various functions by using an operation panel 16 (see FIG. 2) provided in the image forming device 10. Hereinafter, a user interface displayed on the operation panel 16 to set various settings as a result of a user performing a touch operation on the operation panel 16 may also be called a panel user interface (UI). As another example of the setters, the image forming device 10 includes a setter that sets settings of various functions by displaying a setting page provided by a web server integrated in the body of the image forming device 10 on a display mechanism 55 (see FIG. 3) of the terminal device 50 by using browser software and by operating the displayed setting page. Hereinafter, a user interface that sets various settings by using a setting page displayed on the terminal device 50 may also be called a web UI.

In the exemplary embodiment, the panel UI and the web UI are implemented by different types of software. Thus, some of the setting items for which the panel UI can set settings may be different from those for which the web UI can set settings. Even when the panel UI and the web UI can set a setting for the same setting item, the content of the setting for this setting item may be different between the panel UI and the web UI. For example, there may be case in which, for the same setting item, the panel UI can set a detailed setting, while the web UI can set only a basic setting. The panel UI is an example of first software, while the web UI is an example of second software.

The terminal device 50 in the exemplary embodiment is a computer device, such as a general-purpose personal computer, a mobile computer, a mobile phone, a smartphone, and a tablet. Under the control of an operating system (OS), the terminal device 50 activates various pieces of application software in response to a user operation so as to connect to the web server of the image forming device 10 and to provide various instructions, such as an image reading instruction and a print instruction, to the image forming device 10.

(Hardware Configuration of Image Forming Device 10)

Figure 2:
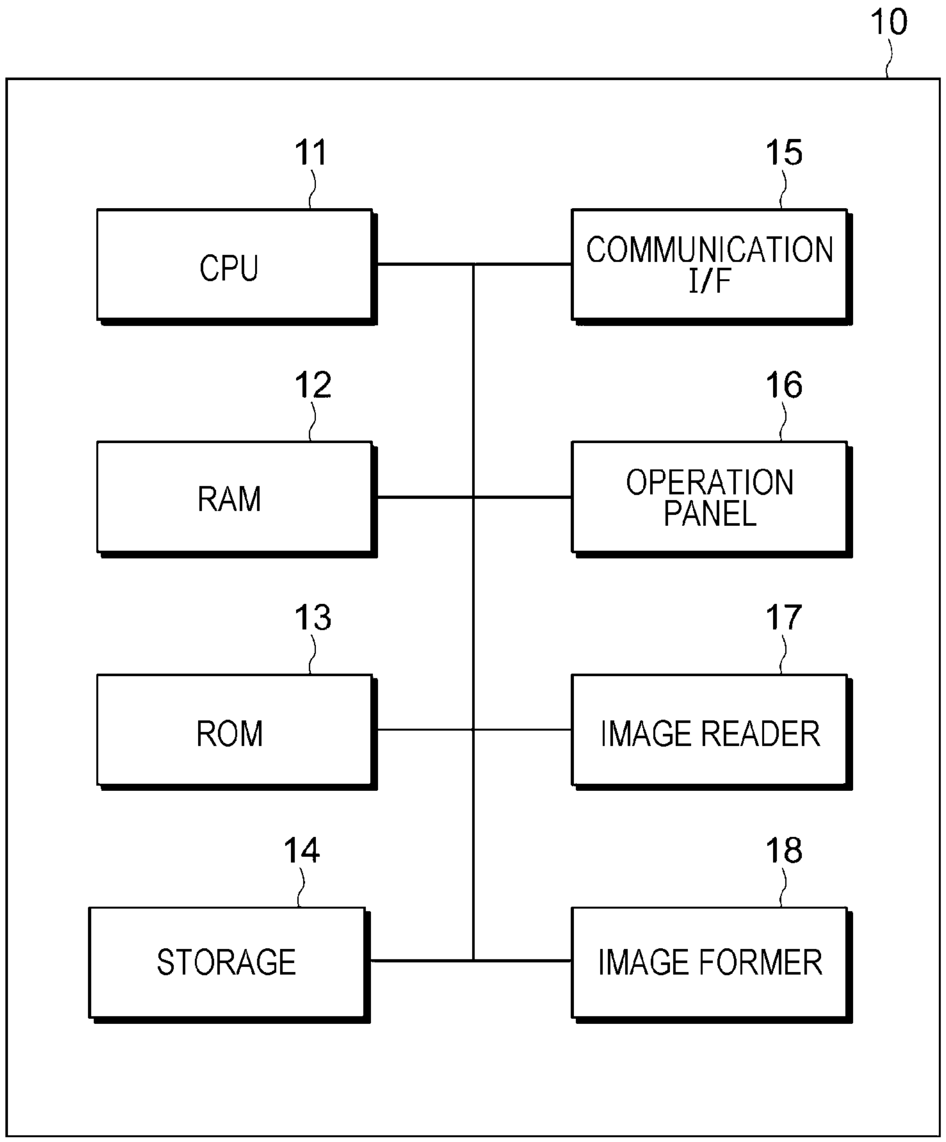
FIG. 2 is a block diagram illustrating an example of the hardware configuration of an image forming device.

FIG. 2 is a block diagram illustrating an example of the hardware configuration of the image forming device 10.

As illustrated in FIG. 2, the image forming device 10 includes a central processing unit (CPU) 11, a random access memory (RAM) 12, and a read only memory (ROM) 13. The CPU 11 is an example of a processor and controls the entirety of the image forming device 10. The RAM 12 is used as a work area for the CPU 11 to execute calculations. The ROM 13 is a memory that stores various programs to be executed by the CPU 11, for example. The image forming device 10 also includes a storage 14, a communication interface (hereinafter called the communication I/F) 15, an operation panel 16, an image reader 17, and an image former 18. The storage 14 stores image information, for example. The communication I/F 15 sends and receives data via the network 70 (see FIG. 1). The operation panel 16 displays various types of information and receives an operation input from a user. The operation panel 16 is a touchscreen, for example. The image reader 17 reads an image recorded on a document. The image former 18 is a print mechanism that forms an image on a recording medium.

(Hardware Configuration of Terminal Device 50)

The hardware configuration of the terminal device 50 will now be described below.

Figure 3:
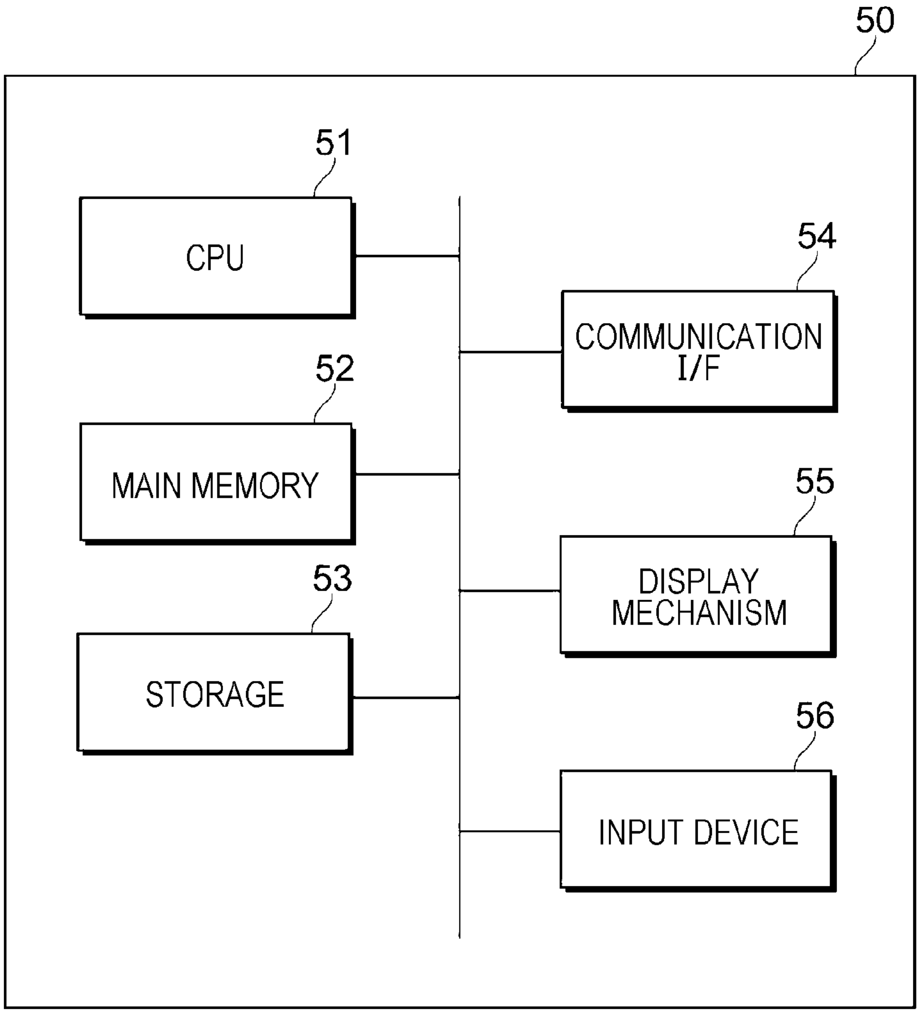
FIG. 3 is a block diagram illustrating an example of the hardware configuration of a terminal device.

FIG. 3 is a block diagram illustrating an example of the hardware configuration of the terminal device 50.

As illustrated in FIG. 3, the terminal device 50 includes a CPU 51, a main memory 52, and a storage 53. The CPU 51 executes various pieces of software, such as an OS and applications. The main memory 52 is used as a storage region that stores various pieces of software and various items of data. The storage 53 is a storage region that stores data input into various pieces of software and data output from various pieces of software, for example. The terminal device 50 also includes a communication I/F 54, a display mechanism 55, and an input device 56. The communication I/F 54 communicates with external devices. The display mechanism 55 is constituted by a video memory and a display, for example, and displays various types of information. The input device 56 is a device, such as a keyboard and a mouse, used for receiving information from a user.

(Functional Configuration of Display Control System 1)

Figure 4:
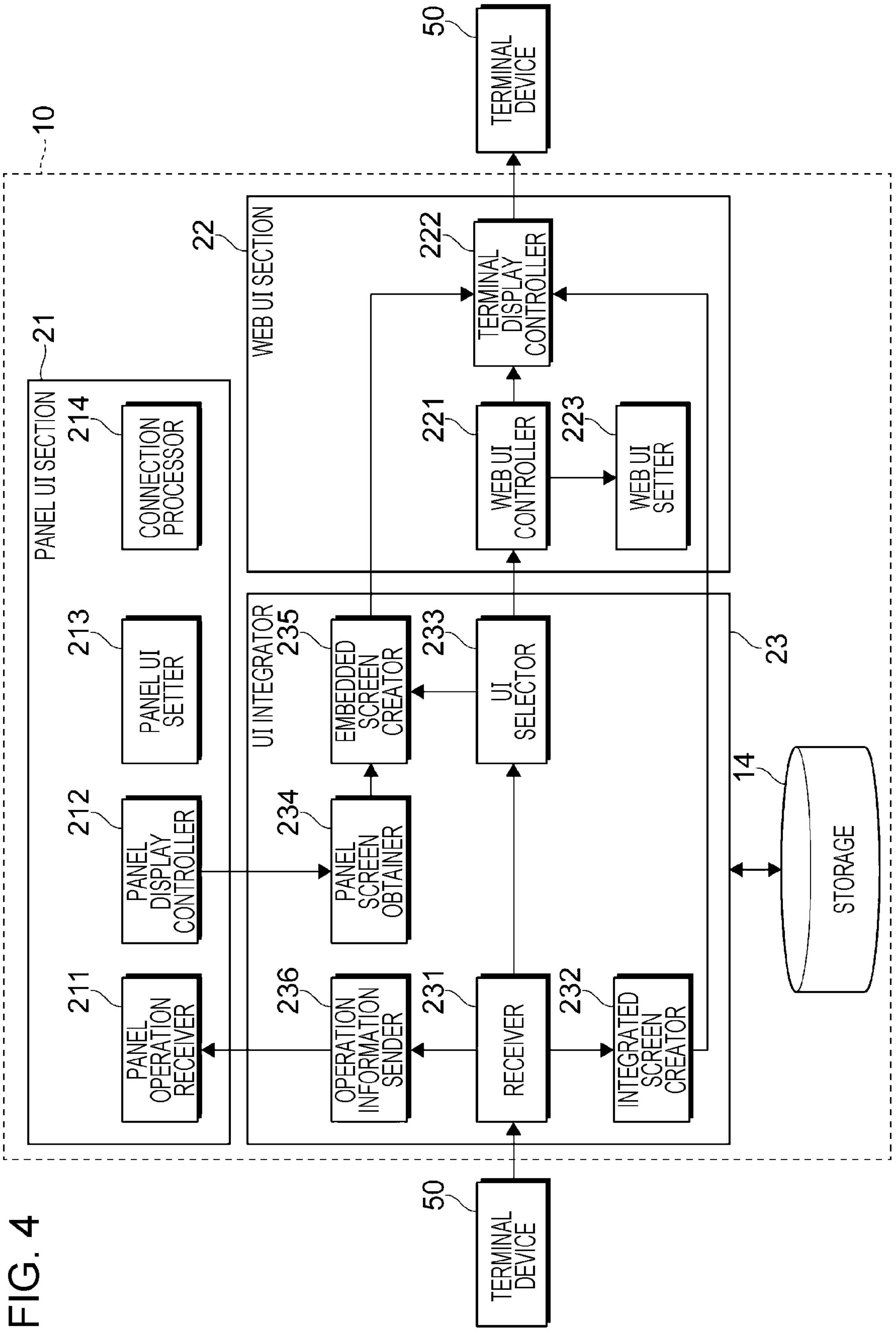
FIG. 4 is a block diagram illustrating an example of the functional configuration of the image forming device.

FIG. 4 is a block diagram illustrating an example of the functional configuration of the image forming device 10.

The image forming device 10 according to the exemplary embodiment includes a panel UI section 21, a web UI section 22, and an UI integrator 23. The panel UI section 21 controls the panel UI displayed on the operation panel 16 (see FIG. 2). The web UI section 22 controls the web UI displayed on the terminal device 50 via the network 70 (see FIG. 1). The UI integrator 23 integrates the panel UI and the web UI into each other.

The panel UI section 21 includes a panel operation receiver 211, a panel display controller 212, a panel UI setter 213, and a connection processor 214. The panel operation receiver 211 receives a user operation performed on the panel UI. The panel display controller 212 controls the displaying of the operation panel 16. The panel UI setter 213 sets settings of various functions of the image forming device 10, based on a user operation received by the panel operation receiver 211. The connection processor 214 executes connection processing when the panel UI is to be remotely operated.

When a touch operation is performed on the operation panel 16, the panel operation receiver 211 identifies an object corresponding to a position at which the touch operation is performed. The object is an icon or a button displayed on the operation panel 16.

The panel display controller 212 performs display control in accordance with the object identified by the panel operation receiver 211. The panel display controller 212 has a menu screen that displays icons for selecting a function to be used, a setting item screen for displaying setting items corresponding to a selected function, and a setting screen for inputting the content of a setting. The panel display controller 212 shifts these screens from one to another in response to a user operation to receive a setting set for a setting item corresponding to a selected function from a user. The icons for selecting functions are graphical representations of functions, such as "print", "copy", and "scanner", for example. Setting items are preset for each function. For example, in the case of the function "scanner", "maximum number of pages stored" and "duplex document feed", for example, are setting items. As a result of a user selecting a setting item, the setting screen for setting a setting for the selected setting item is displayed.

The panel UI setter 213 sets settings of various functions of the image forming device 10, based on the content of settings input by a user operating the setting screen.

When the panel UI is to be remotely operated, the connection processor 214 executes processing for connecting the panel UI section 21 with a client performing a remote control operation. A virtual network computing (VNC) technology, for example, may be used to remotely operate the panel UI. With this VNC technology, a screen of the panel UI displayed on the operation panel 16 is displayed on the terminal device 50, and a client can perform an operation on the screen of the panel UI displayed on the terminal device 50 so as to remotely operate the panel UI.

While one user is remotely operating the panel UI, the connection processor 214 executes locking processing for the operation panel 16 so as to prevent another user from directly performing a touch operation on the operation panel 16. The locking processing for the operation panel 16 is processing for disabling a touch operation performed on the operation panel 16 and for displaying information that the operation panel 16 is being remotely operated by another user. The connection processor 214 also executes another connection processing, such as login authentication.

The web UI section 22 includes a web UI controller 221, a terminal display controller 222, and a web UI setter 223. The web UI controller 221 controls the web UI. The terminal display controller 222 controls a screen to be displayed on the terminal device 50. The web UI setter 223 sets settings of various functions of the image forming device 10, based on settings received from a user.

Based on the operation performed by a user on the web UI displayed on the terminal device 50, the web UI controller 221 shifts the displaying of the web UI so as to receive settings of various functions of the image forming device 10 from the user.

The terminal display controller 222 changes the screen to be displayed on the terminal device 50, based on the control operation performed by the web UI controller 221. The terminal display controller 222 also executes processing for displaying a screen created by an embedded screen creator 235 or an integrated screen creator 232, which will be discussed later, on the display device 50.

The web UI setter 223 sets settings of various functions of the image forming device 10 in accordance with the content of settings received by the web UI controller 221.

The UI integrator 23 includes a receiver 231, an integrated screen creator 232, a UI selector 233, a panel screen obtainer 234, an embedded screen creator 235, and an operation information sender 236. The receiver 231 receives an instruction sent from the terminal device 50. The integrated screen creator 232 creates an integrated screen by integrating the setting items of the panel UI and those of the web UI into each other. The UI selector 233 selects which one of the panel UI and the web UI is to be used. The panel screen obtainer 234 obtains a screen of the panel UI. The embedded screen creator 235 creates an embedded screen by embedding an image of the panel UI into a screen of the web UI. The operation information sender 236 sends operation information about a remote control operation performed on the panel UI by the terminal device 50 to the panel operation receiver 211 of the panel UI section 21.

When an operation for selecting a function from a menu screen of the web UI is received, the integrated screen creator 232 creates an integrated UI screen of the selected function. The integrated UI screen is a screen for selecting a setting item of the selected function. On the integrated UI screen, plural setting items including setting items for which the panel UI can set settings and those for which the web UI can set settings are displayed in a mode in which a user can select a setting item from the displayed setting items. The integrated screen creator 232 creates the integrated UI screen by referring to a setting function implementation table, which will be discussed later with reference to FIG. 5, stored in the storage 14. The setting function implementation table stores, for a certain function, setting items for which setting can be set when using this function, and also stores, for each setting item, information indicating whether the panel UI can set a setting of a certain setting item and whether the web UI can set a setting of a certain setting item.

In response to the receiving of the selection of a setting item on the integrated UI screen from a user, the UI selector 233 refers to the setting function implementation table stored in the storage 14 and determines which one of the panel UI and the web UI is to be used for setting a setting for the selected setting item.

The panel screen obtainer 234 obtains image data of a screen displayed on the operation panel 16. The panel screen obtainer 234 sends a request to perform a remote control operation on the panel UI to the connection processor 214. If it is possible to connect to the panel UI section 21, the panel screen obtainer 234 obtains the image displayed on the operation panel 16 from the panel display controller 212.

The embedded screen creator 235 creates an embedded screen by embedding the image displayed on the operation panel 16 obtained by the panel screen obtainer 234 into the screen of the web UI. The embedded screen is displayed on the terminal device 50 by the terminal display controller 222. As a result of performing an operation on the embedded screen, the panel UI is remotely operated.

The operation information sender 236 obtains operation information about the operation performed on the embedded screen displayed on the terminal device 50 from the receiver 231. The operation information sender 236 then converts the obtained operation information into position information of a position on a touchscreen of the operation panel 16 so that the panel operation receiver 211 can interpret the operation information. The operation information sender 236 then sends the converted position information to the panel operation receiver 211.

(Setting Function Implementation Table)

FIG. 5 illustrates an example of a setting function implementation table 500 stored in the storage 14 of the image forming device 10.

The setting function implementation table may be stored in a storage other than the storage 14 if it can be read by the CPU 11. For example, the setting function implementation table may be stored in an external storage connected to the image forming device 10 via the network 70.

The setting function implementation table 500 shown in FIG. 5 indicates multiple setting items 501, for which settings can be set, for a scanner function. For each of the setting items 501, the numeric value indicating whether the panel UI can set a setting of a certain setting item 501 and that whether the web UI can set a setting of a certain setting item 501 are stored.

If the numeric value stored in a column "Panel UI" for a certain setting item 501 indicates "0", it means that the panel UI is unable to set a setting for this setting item 501. If the numeric value stored in the column "Panel UI" for a certain setting item 501 indicates "1", it means that the panel UI is able to set a setting for this setting item 501. Likewise, if the numeric value stored in a column "Web UI" for a certain setting item 501 indicates "0", it means that the web UI is unable to set a setting for this setting item 501. If the numeric value stored in the column "Web UI" for a certain setting item 501 indicates "1", it means that the web UI is able to set a setting for this setting item 501.

In one example, for the setting item 501 "Background color removal", the numeric value of the panel UI is "0", while that of the web UI is "1", and this setting item 501 is a setting item for which the web UI can set a setting. In another example, for the setting item 501 "maximum number of pages stored", the numeric value of the panel UI is "1", while that of the web UI is "0", and this setting item 501 is a setting item for which the panel UI can set a setting.

In the setting function implementation table 500 in FIG. 5, the setting items 501, for which settings can be set, for the scanner function are shown by way of example. A setting function implementation table 500 is also stored for another function, such as a copy function and a print function. That is, the setting function implementation table 500 is stored for each function.

(Processing of Display Control System)

Figure 7:
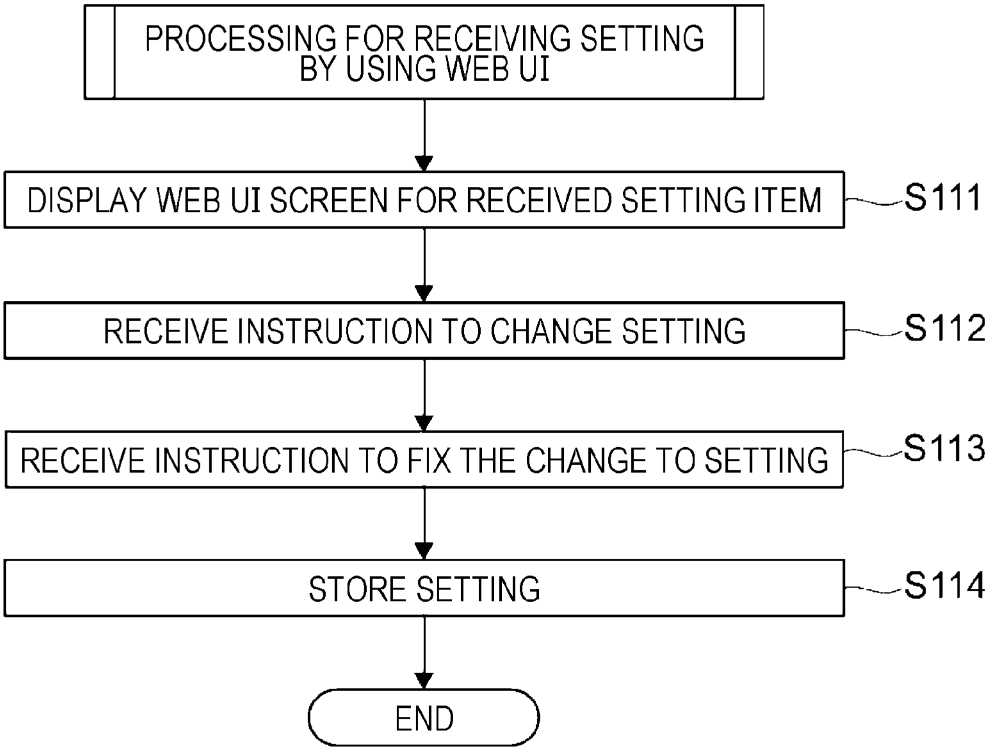
FIG. 7 is a flowchart illustrating an example of processing for receiving a setting by using a web user interface (UI)
Figure 8:
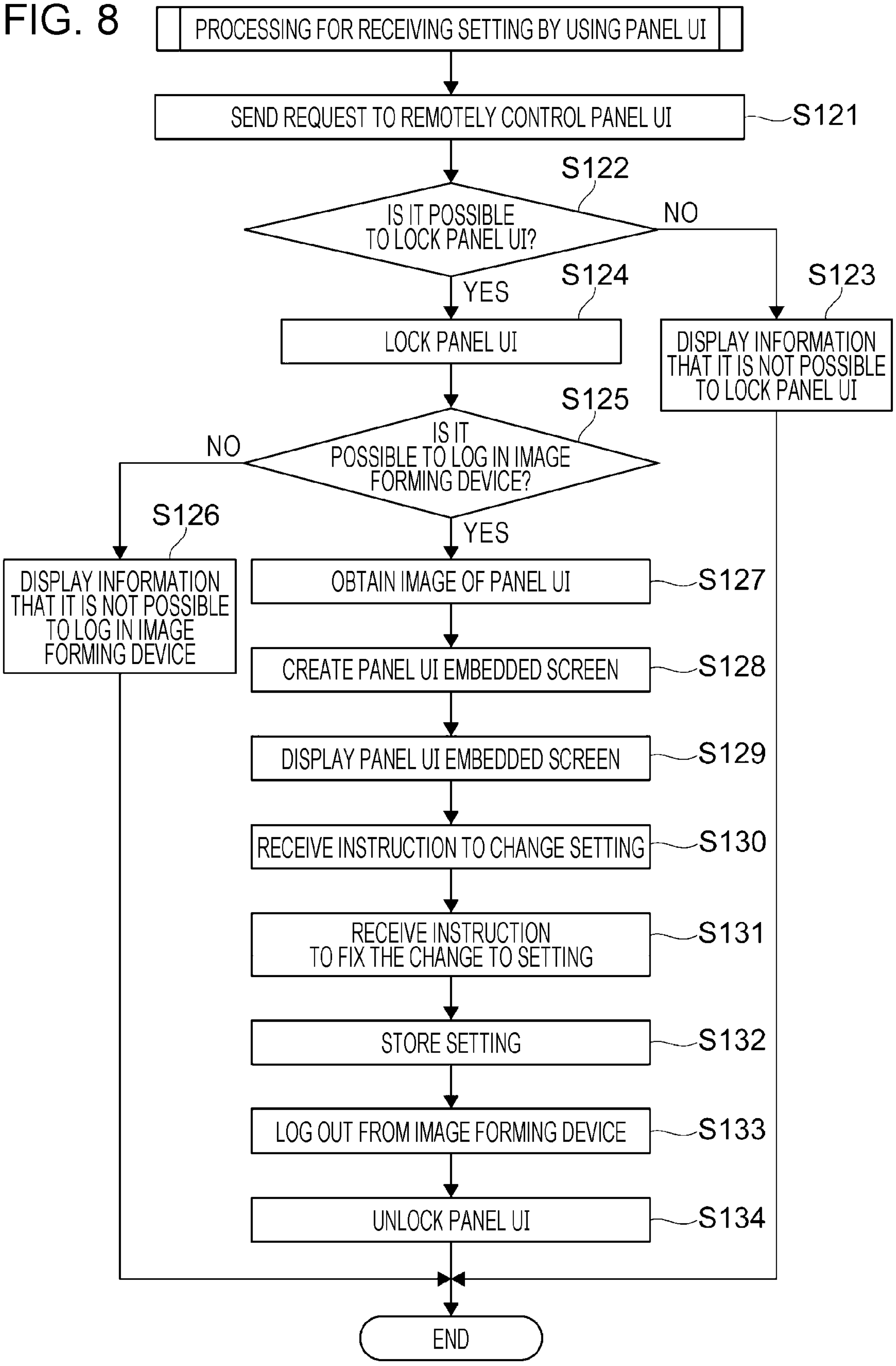
FIG. 8 is a flowchart illustrating an example of processing for receiving a setting by using a panel UI.

Processing procedures executed by the web server will be discussed below with reference to the flowcharts of FIGS. 6 through 8.

Figure 6:
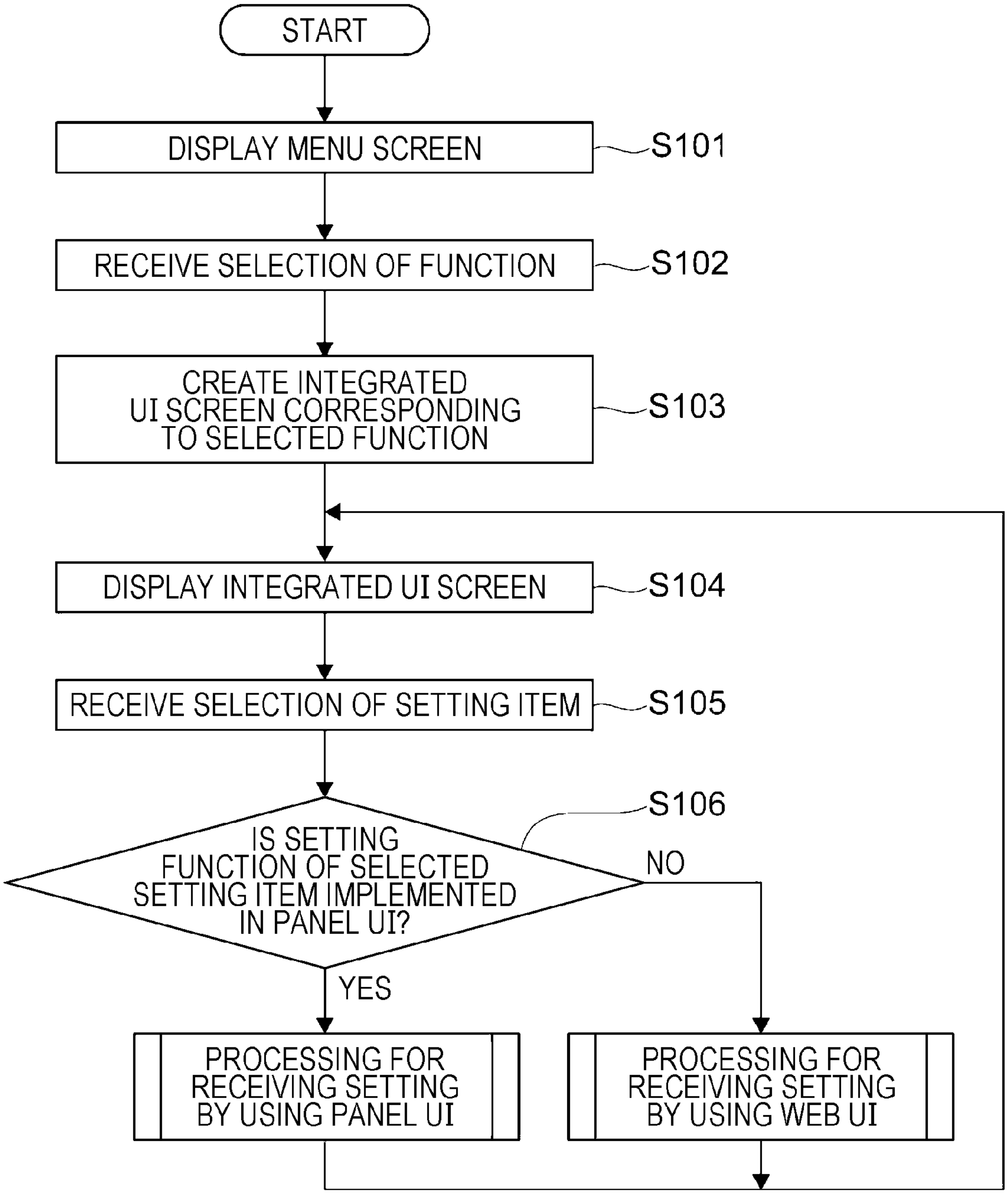
FIG. 6 is a flowchart illustrating an example of processing for receiving the selection of a setting item.

FIG. 6 is a flowchart illustrating an example of processing for receiving the selection of a setting item. FIG. 7 is a flowchart illustrating an example of processing for receiving a setting by using a web UI. FIG. 8 is a flowchart illustrating an example of processing for receiving a setting by using a panel UI.

The processing illustrated in FIG. 6 starts when a user accesses the image forming device 10 by using the terminal device 50. In step S101, the terminal display controller 222 displays a menu screen, which is preset as the initial screen, on the terminal device 50. On this menu screen, options of functions to be executed by the image forming device 10 are displayed.

In step S102, the receiver 231 receives the selection of a function from the terminal device 50. Then, in step S103, the integrated screen creator 232 refers to the setting function implementation table and creates an integrated UI screen corresponding to the selected function. Then, in step S104, the terminal display controller 222 displays the integrated UI screen on the terminal device 50.

In step S105, the receiver 231 receives the selection of a setting item from the terminal device 50. Then, in step S106, the UI selector 233 refers to the setting function implementation table and determines whether a setting function of the selected setting item is implemented in the panel UI. If a setting function of the selected setting item is not implemented in the panel UI (NO in step S106), the process proceeds to processing for receiving a setting of a setting item by using the web UI. Processing for receiving a setting by using the web UI will be discussed later with reference to the flowchart of FIG. 7. After the completion of processing for receiving a setting by using the web UI, the process returns to step S104 and displays a selection screen.

If a setting function of the selected setting item is implemented in the panel UI (YES in step S106), the process proceeds to processing for receiving a setting by using the panel UI. Processing for receiving a setting by using the panel UI will be discussed later with reference to the flowchart of FIG. 8. After the completion of processing for receiving a setting by using the panel UI, the process returns to step S104 and displays a selection screen.

Processing for receiving a setting by using the web UI will be described below with reference to FIG. 7.

After shifting to the processing for receiving a setting by using the web UI, in step S111, the terminal display controller 222 displays a web UI screen for the setting item received in step S105 in FIG. 6 on the terminal device 50. Then, in step S112, if an instruction to change a setting is received, the web UI setter 223 temporarily stores the content of a change to the setting. Then, if an instruction to fix the change to the setting is received in step S113, the web UI setter 223 stores the setting in step S114. Then, the processing is completed.

Processing for receiving a setting by using the panel UI will be described below with reference to FIG. 8.

After shifting to the processing for receiving a setting by using the panel UI, in step S121, the panel screen obtainer 234 sends a request to remotely control the panel UI to the connection processor 214. In step S122, the connection processor 214 determines whether it is possible to lock the panel UI. If it is not possible to lock the panel UI (NO in step S122), the terminal display controller 222 displays information that it is not possible to lock the panel UI on the terminal device 50 in step S123. The processing is then terminated.

If it is possible to lock the panel UI (YES in step S122), the connection processor 214 locks the panel UI in step S124 and determines whether it is possible to log in the image forming device 10 in step S125. If it is not possible to log in the image forming device 10 (NO in step S125), the terminal display controller 222 displays information that it is not possible to log in the image forming device 10 on the terminal device 50 in step S126. The processing is then terminated.

If it is possible to log in the image forming device 10 (YES in step S125), the connection processor 214 logs in the image forming device 10. Then, in step S127, the panel screen obtainer 234 obtains the image of the panel UI. In step S128, the embedded screen creator 235 creates an embedded screen by embedding the image of the setting screen of the panel UI for setting a setting for the setting item received in step S105 into the screen of the web UI. Then, in step S129, the terminal display controller 222 displays the embedded screen on the terminal device 50.

Then, in step S130, if an instruction to change a setting is received from a user, the panel UI setter 213 temporarily stores the content of a change to the setting. Then, if an instruction to fix the change to the setting is received from the user in step S131, the panel UI setter 213 fixes the setting and stores the fixed setting in step S132. Then, the connection processor 214 logs out from the image forming device 10 in step S133 and unlocks the panel UI in step S134. Then, the processing is completed.

(Display Screens)

Screens displayed on the terminal device 50 will be discussed below with reference to FIGS. 9 through 10B.

Figure 9:
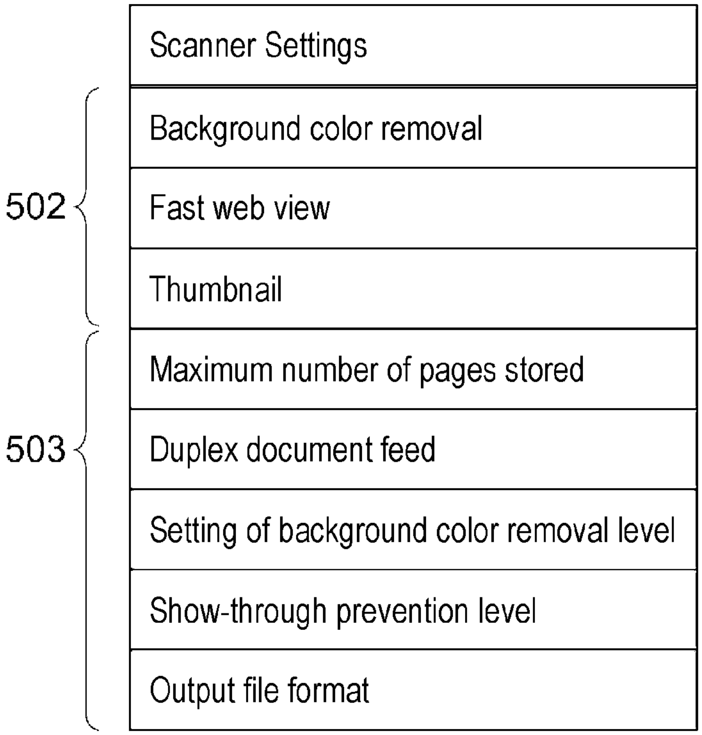
FIG. 9 illustrates an example of an integrated UI screen displayed on the terminal device.
Figure 10A:
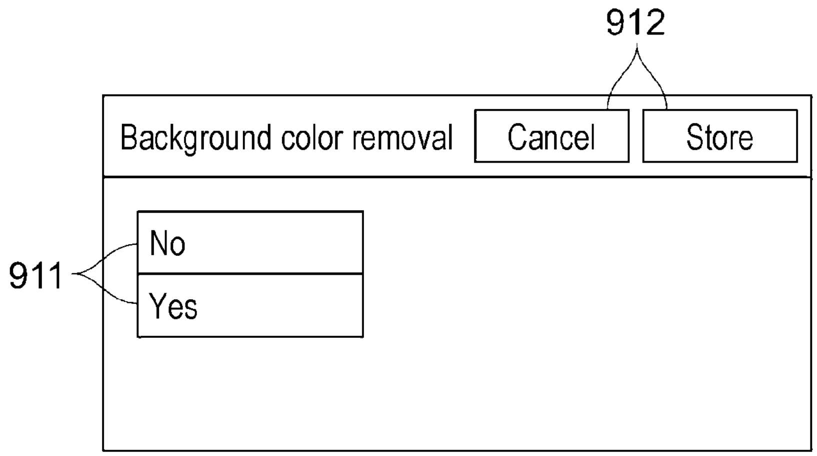
FIG. 10A illustrates an example of a setting screen of the web UI.

FIG. 9 illustrates an example of the integrated UI screen displayed on the terminal device 50. FIG. 10A illustrates an example of a setting screen for setting a setting by using the web UI. FIG. 10B illustrates an example of a setting screen into which the panel UI is embedded.

The integrated UI screen shown in FIG. 9 is a UI screen created based on the setting function implementation table shown in FIG. 5. On this integrated UI screen, setting items 502 for which the web UI can set settings and setting items 503 for which the panel UI can set settings are displayed in a mode in which a user can select a setting item from the setting items 502 and the setting items 503. In the example in FIG. 9, the setting items 502 for which the web UI can set settings and the setting items 503 for which the panel UI can set settings are displayed in the same display mode. A user is thus less likely to be aware of which one of the panel UI and the web UI is to be used for a setting of a setting item.

To let a user know which one of the panel UI and the web UI is to be used for a setting of a setting item, the setting items 502 and the setting items 503 may be displayed in different modes. In one example, the setting items 502 and the setting items 503 may be displayed in different colors. In another example, a sign or a mark representing the web UI may be displayed in association with the setting items 502, while a sign or a mark representing the panel UI may displayed in association with the setting items 503.

Examples of setting screens will be discussed below with reference to FIGS. 10A and 10B.

FIG. 10A illustrates a web UI setting screen displayed on the terminal device 50 when the setting item 502 "Background color removal" in FIG. 9 is selected. On this setting screen, a selection button 911 that says "Yes" and another selection button 911 that says "No" for changing a setting are displayed. A user operates one of the selection buttons 911 to change a setting. A shift button 912 that says "Cancel" and another shift button 912 that says "Store" for shifting the screen are also displayed. A user operates one of the shift buttons 912 to select whether to return to the integrated UI screen shown in FIG. 9 without changing a setting or to store the content of a change to a setting and return to the integrated UI screen in FIG. 9.

Figure 10B:
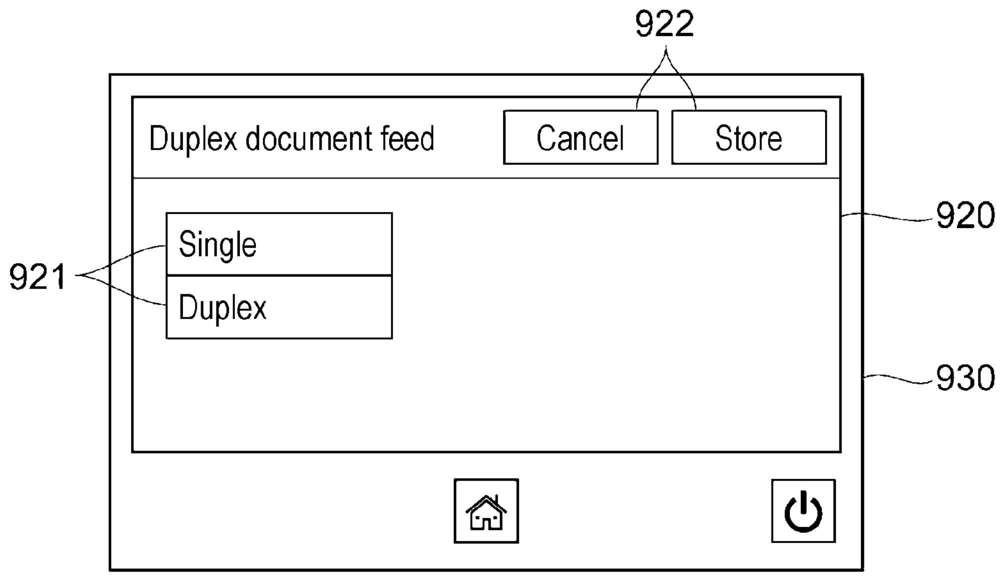
FIG. 10B illustrates an example of a setting screen into which the panel UI is embedded.

FIG. 10B illustrates a setting screen displayed on the terminal device 50 when the setting item 503 "Duplex document feed" in FIG. 9 is selected. This setting screen is a screen created by the embedded screen creator 235.

In the setting screen in FIG. 10B, an image 920 displayed on the operation panel 16 is embedded into a frame 930 simulating a frame supporting the operation panel 16 (see FIG. 2) of the image forming device 10. The image 920 includes two selection buttons 921 for changing the setting. One selection button 921 says "Single", while the other selection button 921 says "Duplex". A user selects one of the selection buttons 921 to change the setting.

The image 920 also includes two shift buttons 922 for shifting the screen. When a shift button 922 that says "Cancel" is operated, the setting screen returns to the integrated UI screen shown in FIG. 9 without changing the setting. When a shift button 922 that says "Store" is operated, the content of a change to the setting is stored and the setting screen returns to the integrated UI screen in FIG. 9.

In the above-described exemplary embodiment, multiple setting items including those for which the panel UI can set settings and those for which the web UI can set settings are presented to a user without changing the display mode. This enables the user to change a setting without being aware of the presence of multiple setters for changing the setting.

First Modified Example

The UI selector 233 may select the panel UI or the web UI in a different manner from that described in the above-described exemplary embodiment. An example of such a case will be explained below with reference to FIG. 11.

In the above-described exemplary embodiment, if the panel UI can set a setting for a certain setting item, the panel UI is used for a setting of this setting item. In a first modified example, if a setting of a setting item can be set by both of the panel UI and the web UI, it is determined whether the panel UI or the web UI is to be used. In the first modified example, the UI selector 233 selects the panel UI or the web UI in a different manner from the exemplary embodiment and the content of the setting function implementation table 500 used by the UI selector 233 is different from that of the exemplary embodiment.

FIG. 11 illustrates an example of the setting function implementation table 500 used in the first modified example.

In this setting function implementation table 500, for each setting item 501, the priority of the panel UI and that of the web UI are indicated by numeric value "0", "1", or "2". If, for a certain setting item 501, the numeric value of a UI is "0", it means that this UI does not have a function of setting a setting of the setting item 501. If, for a certain setting item 501, the numeric value of a UI is "1", it means that this UI has a function of setting a setting of the setting item 501 but has a lower priority. If, for a certain setting item 501, the numeric value of a UI is "2", it means that this UI has a function of setting a setting of the setting item 501 and has a higher priority. For example, in the case of the setting item 501 "Thumbnail", the numeric value of the panel UI is "2", while that of the web UI is "1". The UI selector 233 thus determines that the priority of the panel UI is higher than that of the web UI.

Upon receiving the selection of a setting item on the integrated UI screen from a user, the UI selector 233 refers to the setting function implementation table stored in the storage 14, compares the priority of the panel UI and that of the web UI for the selected setting item, and then selects the UI having a higher priority.

Regarding a setting item for which the priority of the panel UI and that of the web UI are the same, a condition, such as that the web UI is preferentially selected, can be preset. Another condition, such as that the UI is selected in accordance with the size of the display screen of the display mechanism 55 of the terminal device 50, may be preset. For example, a condition, such as that the web UI is selected if the size of the display screen of the display mechanism 55 of the terminal device 50 is larger than that of the display screen of the operation panel 16 of the image forming device 10, may be preset.

If the priority of the panel UI and that of the web UI are the same, both of the setting screen using the web UI and that using the panel UI may be displayed on the display device 50. Alternatively, options of the web UI and the panel UI may be displayed to let a user select one of them.

As described above, according to the first modified example, when setting a setting of a function of the image forming device 10, if there is a setting item for which more than one setter can set a setting, the setter to be used is determined in accordance with the priority preset for each setter. This may save a user selecting the setter.

Second Modified Example

Another modified example in which the UI selector 233 selects the panel UI or the web UI in a different manner from the exemplary embodiment will be discussed below with reference to FIGS. 12A and 12B.

FIG. 12A illustrates an example of the setting function implementation table 500 used in a second modified example. FIG. 12B illustrates an example of a sub-item implementation table 600 indicating UIs that can set settings of sub-items.

As in the setting function implementation table 500 shown in FIG. 5, the setting function implementation table 500 in FIG. 12A indicates multiple setting items 501, for which settings can be set, for the scanner function. For each of the setting items 501, the numeric value indicating whether the panel UI can set a setting of a certain setting item 501 and that whether the web UI can set a setting of a certain setting item 501 are stored. If, for a certain setting item 501, the numeric value "1" is associated with a UI, it means that this UI is able to set a setting of the setting item 501. If, for a certain setting item 501, the numeric value "0" is associated with a UI, it means that this UI is unable to set a setting of the setting item 501.

In the setting function implementation table 500 in FIG. 12A, for the setting item 501 "Output file format", "1" is stored in the column of the panel UI and "1" is also stored in the column of the web UI. That is, the setting item 501 "Output file format" can be set by both of the panel UI and the web UI.

In the sub-item implementation table 600 in FIG. 12B, for each sub-item 601 of the setting item 501 "Output file format", the numeric value indicating whether the panel UI can set a setting of a certain sub-item 601 and that indicating whether the web UI can set a setting of a certain sub-item 601 are stored. If, for a certain sub-item 601, the numeric value stored in the column of the panel UI is "0", it means that the panel UI is unable to set a setting for this sub-item 601. If, for a certain sub-item 601, the numeric value stored in the column of the panel UI is "1", it means that the panel UI is able to set a setting for this sub-item 601. Likewise, if, for a certain sub-item 601, the numeric value stored in the column of the web UI is "0", it means that the web UI is unable to set a setting for this sub-item 601. If, for a certain sub-item 601, the numeric value stored in the column of the web UI is "1", it means that the web UI is able to set a setting for this sub-item 601.

As a basis for selecting the panel UI or the web UI, the UI selector 233 can utilize a condition based on the sub-items. In one example, concerning the sub-items of a selected setting item, the UI selector 233 may select the UI that can set settings of a greater number of sub-items. In another example, concerning the sub-items of a selected setting item, if a first UI can set settings of a greater number of sub-items than a second UI and can also set settings for all the sub-items for which the second UI can set settings, the UI selector 233 may select the first UI.

As described above, according to the second modified example, when setting a setting of a function of the image forming device 10, if there is a setting item for which more than one setter can set a setting, the setter that can set a setting in greater detail may be automatically selected.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

<Appendix>

(((1)))

A display control system comprising:

at least one processor configured to:

display for a user a plurality of setting items including a setting item for which first software is able to set a setting and a setting item for which second software is able to set a setting in a mode in which the user is able to select a setting item from the plurality of setting items, the first software and the second software being different from each other;

receive selecting of a setting item from the displayed setting items from the user; and display, between a first setting screen and a second setting screen, a setting screen that is able to set a setting for the setting item selected by the user, the first setting screen being used for setting a setting with the first software, the second setting screen being used for setting a setting with the second software.

(((2)))

The display control system according to (((1))), wherein the at least one processor is configured to display one of the first setting screen and the second setting screen in response to selecting of a setting item included in both of the first setting screen and the second setting screen.

(((3)))

The display control system according to (((2))), wherein the at least one processor is configured to display one of the first setting screen and the second setting screen, based on a priority of the first software and a priority of the second software, the priority of the first software and the priority of the second software being preset for each of the plurality of setting items.

(((4))

The display control system according to (((2))), wherein the at least one processor is configured to display one of the first setting screen and the second setting screen, between the first software and the second software, software using the displayed one of the first setting screen and the second setting screen being able to set a setting for the setting item selected by the user in greater detail.

(((5))

The display control system according to (((4)), wherein:

the setting item selected by the user has a plurality of sub-items including a sub-item for which the first software is able to set a setting and a sub-item for which the second software is able to set a setting; and the at least one processor is configured to display one of the first setting screen and the second setting screen, the displayed one of the first setting screen and the second setting screen including a greater number of sub-items than the other one of the first setting screen and the second setting screen.

(((6))

The display control system according to (((2))), wherein the at least one processor is configured to display one of the first setting screen and the second setting screen, based on a size of a display screen on which the first setting screen is to be displayed and a size of a display screen on which the second setting screen is to be displayed.

(((7))

The display control system according to (((1)), wherein the at least one processor is configured to display both of the first setting screen and the second setting screen in response to selecting of a setting item included in both of the first setting screen and the second setting screen.

(((8))

A program causing a computer to implement:

a setting item display function that displays for a user a plurality of setting items including a setting item for which first software is able to set a setting and a setting item for which second software is able to set a setting in a mode in which the user is able to select a setting item from the plurality of setting items, the first software and the second software being different from each other;

a receiving function that receives selecting of a setting item from the displayed setting items from the user; and a setting screen display function that displays, between a first setting screen and a second setting screen, a setting screen that is able to set a setting for the setting item selected by the user, the first setting screen being used for setting a setting with the first software, the second setting screen being used for setting a setting with the second software.

What is claimed is:

1. A display control system comprising:

at least one processor configured to:

display for a user a plurality of setting items including a setting item for which first software is able to set a setting and a setting item for which second software is able to set a setting in a mode in which the user is able to select a setting item from the plurality of setting items, the first software and the second software being different from each other;

receive selecting of a setting item from the displayed setting items from the user; and display, between a first setting screen and a second setting screen, a setting screen that is able to set a setting for the setting item selected by the user, the first setting screen being used for setting a setting with the first software, the second setting screen being used for setting a setting with the second software, wherein the at least one processor is configured to display one of the first setting screen and the second setting screen in response to selecting of a setting item included in both of the first setting screen and the second setting screen, wherein the at least one processor is configured to display one of the first setting screen and the second setting screen, based on a priority of the first software and a priority of the second software, the priority of the first software and the priority of the second software being preset for each of the plurality of setting items.

2. The display control system according to claim 1, wherein the at least one processor is configured to display one of the first setting screen and the second setting screen, between the first software and the second software, software using the displayed one of the first setting screen and the second setting screen being able to set a setting for the setting item selected by the user in greater detail.

3. The display control system according to claim 2, wherein:

the setting item selected by the user has a plurality of sub-items including a sub-item for which the first software is able to set a setting and a sub-item for which the second software is able to set a setting; and the at least one processor is configured to display one of the first setting screen and the second setting screen, the displayed one of the first setting screen and the second setting screen including a greater number of sub-items than the other one of the first setting screen and the second setting screen.

4. The display control system according to claim 1, wherein the at least one processor is configured to display one of the first setting screen and the second setting screen, based on a size of a display screen on which the first setting screen is to be displayed and a size of a display screen on which the second setting screen is to be displayed.

5. The display control system according to claim 1, wherein the at least one processor is configured to display both of the first setting screen and the second setting screen in response to selecting of a setting item included in both of the first setting screen and the second setting screen.

6. A display control method comprising:

displaying for a user a plurality of setting items including a setting item for which first software is able to set a setting and a setting item for which second software is able to set a setting in a mode in which the user is able to select a setting item from the plurality of setting items, the first software and the second software being different from each other;

receiving selecting of a setting item from the displayed setting items from the user;

displaying, between a first setting screen and a second setting screen, a setting screen that is able to set a setting for the setting item selected by the user, the first setting screen being used for setting a setting with the first software, the second setting screen being used for setting a setting with the second software;

displaying one of the first setting screen and the second setting screen in response to selecting of a setting item included in both of the first setting screen and the second setting screen; and displaying one of the first setting screen and the second setting screen, based on a priority of the first software and a priority of the second software, the priority of the first software and the priority of the second software being preset for each of the plurality of setting items.

7. A non-transitory computer readable medium storing a program causing a computer to execute a process, the process comprising:

displaying for a user a plurality of setting items including a setting item for which first software is able to set a setting and a setting item for which second software is able to set a setting in a mode in which the user is able to select a setting item from the plurality of setting items, the first software and the second software being different from each other;

receiving selecting of a setting item from the displayed setting items from the user;

displaying, between a first setting screen and a second setting screen, a setting screen that is able to set a setting for the setting item selected by the user, the first setting screen being used for setting a setting with the first software, the second setting screen being used for setting a setting with the second software;

displaying one of the first setting screen and the second setting screen in response to selecting of a setting item included in both of the first setting screen and the second setting screen; and displaying one of the first setting screen and the second setting screen, based on a priority of the first software and a priority of the second software, the priority of the first software and the priority of the second software being preset for each of the plurality of setting items.

* * * * *